Mar. 27, 1923.
H. E. IVES
1,449,512
HIGH TEMPERATURE MEASUREMENT
Filed Aug. 13, 1920
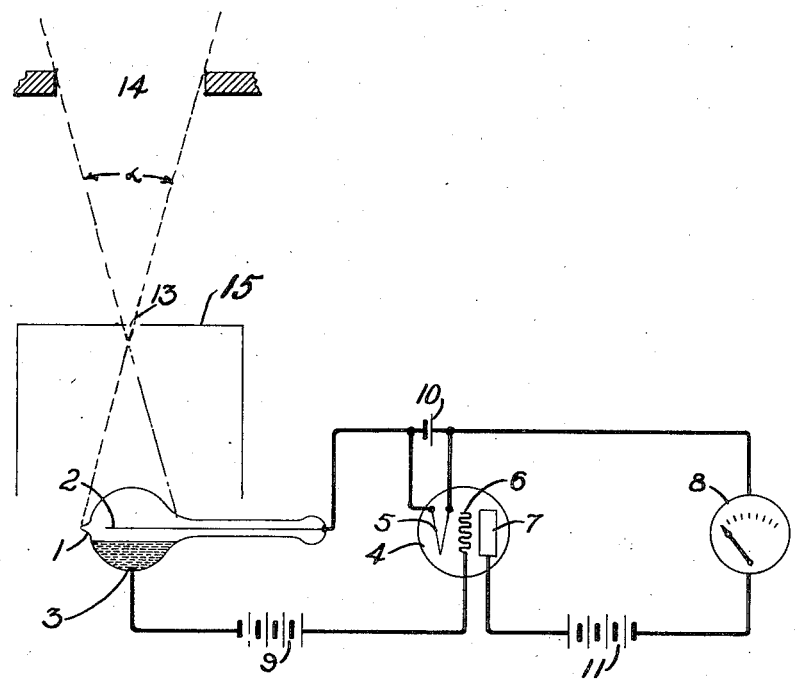
Inventor:
Herbert E. Ives.
by Joel R. Palmer Att'y.

Patented Mar. 27, 1923.

1,449,512

UNITED STATES PATENT OFFICE.

HERBERT E. IVES, OF MONTCLAIR, NEW JERSEY, ASSIGNOR TO WESTERN ELECTRIC COMPANY, INCORPORATED, OF NEW YORK, N. Y., A CORPORATION OF NEW YORK.

HIGH-TEMPERATURE MEASUREMENT.

Application filed August 13, 1920. Serial No. 403,393.

*To all whom it may concern:*

Be it known that I, HERBERT E. IVES, a citizen of the United States, residing at Montclair, in the county of Essex and State of New Jersey, have invented certain new and useful Improvements in High-Temperature Measurements, of which the following is a full, clear, concise, and exact description.

This invention relates to means for measuring temperatures, and more particularly temperatures of the higher values.

For the measurement of temperatures of furnaces, retorts, baking ovens and other heating devices used in the arts, there are available several means, including mercury thermometers, electric resistance thermometers, fusible cones, and thermocouples. These devices are, however, restricted in use to temperatures considerably lower than many now commonly employed in manufacturing processes. For these higher temperatures, which may be roughly classed as 1200° centigrade and over, the only temperature measuring instruments available are those depending upon the radiations emitted from the heated body, variously classified as radiation pyrometers, or optical pyrometers. The term "radiation pyrometer" is most commonly applied to instruments operated by the total radiation emitted from an aperture over the heated body subtending a chosen solid angle, while the term "optical pyrometer" is applied to those instruments which utilize only radiations in the visible or short wave-length region of the spectrum. Optical pyrometers have several conspicuous merits which have made them the most widely used pyrometers of the radiation type. Among these merits may be mentioned their high sensibility, due to the fact that the visible radiation changes in intensity with great rapidity as the temperature varies, this change being roughly as a power higher than ten, while the total radiation varies only as the fourth power. Another advantage lies in the fact that the ordinary furnace gases and dust are much less opaque to the short wave radiation than to the long, and consequently affect the accuracy of the measurements less.

Against these advantages of the optical pyrometer lies the great disadvantage that the quantity of energy available for measurement is so small as to be perceptible only by the most delicate instruments, as for instance, the ordinarily used instrument, the human eye. This means first that the method of observation must be so devised as to meet the limitations of the eye as a measuring instrument, and second, that any method of automatic recording is not feasible. As an illustration may be taken the Morse optical pyrometer, as developed by Holborn and Kurlbaum. In this an incandescent electric lamp is placed between the eye and the heated body; the current through this lamp is then adjusted until a portion of its filament is of the same brightness as the heated body. This current, as registered by a milliammeter, previously calibrated with the particular lamp, against a "black body" of known temperatures, will indicate the temperature of the heated body. It is apparent that the indications of the ammeter are related to the temperature of the heated body only after the observer has employed his eye as a guide to establishing the lamp filament current and that consequently only by repeated observations can there be obtained a continuous record such as is often desired.

It is the object of this invention to provide a means whereby the minute energy of radiation used in the optical pyrometer may be so employed as to give direct indications upon a recording instrument without the intermediation of a visual judgment of brightness equality. A further object is to make possible where desired the recording of such indications by the ordinary types of recording devices which need much greater power for their operation than is available in the radiations as received from furnace openings or other objects whose temperatures it is desired to measure.

It has been found that the current which is generated by a photoelectric cell, as the result of the action thereon of radiant energy, ordinarily of the short wave or visible type, may be used to give upon a properly sensitive current indicating device a measure of the intensity of radiation, and hence, by proper calibration, of the temperature of a radiating body. Currents thus produced have the important quality of being susceptible of amplification to any desired degree. Therefore, the combination of a photoelectric cell with an amplifying device makes possible the use of radiant energy for the direct indication of temperatures on current measuring instruments of rugged types, possible to use outside the physical laboratory, and also the recording of these indications by commonly used apparatus necessitating considerable power for their operation.

The manner of operation of such a means of temperature measurement may be more readily understood by reference to the drawing, in which 1 represents a photoelectric cell, having a positive electrode 2, and a negative electrode 3, 4, an audion comprising the filament 5, rendered luminous by the battery 10, grid 6, and plate 7, 8, a current meter, and 9 and 11 sources of electrical energy in the grid and plate circuits, respectively. Between the heated body 14 and the photo-electric cell 1 and a fixed distance from the latter, is a screen or diaphragm 15 with an aperture 13, the relation of which with respect to the heated body and the cell must be such that the area of the heated body will subtend a larger solid angle from all parts of the sensitive cell than that subtended by the aperture 13, that is, with the diaphragm fixed the heated area must be observed from a distance such that the rays will fill the cone defined by the angle α.

The battery 9, as shown, produces initially a certain small positive potential at the grid 6. When the photoelectric cell current is increased by exposure of the cell to the radiation entering through the aperture 13, from the heated body 14, the electro-motive force impressed on the grid circuit by the battery 9 is increased. This results in a larger positive potential on the grid 6, which in turn permits more current to pass through the plate circuit. The current which is indicated by the current meter 8 is then a measure of the temperature of the heated body, the value of which may be arrived at through calibration curves obtained for the combination of the particular cell and audion used in any specified case.

The invention is not considered to be restricted to the use of a photoelectric cell nor to the particular amplifying arrangement described or even to the use of an audion, which may be replaced by other sensible amplifying devices. The essence of the invention lies in the use for temperature measurement of a sensitive radiometer in place of the eye, whereby direct indications may be obtained on a current reading instrument, and the amplification of the currents produced to a magnitude sufficient to operate rugged indicating or recording instruments which may be used under practical working conditions in factories and industrial plants.

What is claimed is:

1. A device for measuring the temperature of a highly heated body comprising a photo-electric cell for translating radiant energy into electrical energy, a perforated diaphragm at a fixed distance between said cell and the highly heated body, the perforation in said diaphragm subtending a solid angle from all parts of the cell smaller than that subtended by the highly heated body, a vacuum tube for amplifying the current of said electrical energy, and means for registering the amplified current.

2. The method of measuring the temperature of a highly heated body which consists in exposing a photo-electric cell to an area of the heated body subtending a fixed and definite solid angle from the cell surface, converting said radiant energy into electrical energy, amplifying the current resulting from said electrical energy, and registering said amplified current.

In witness whereof, I hereunto subscribe my name this 10th day of August A. D., 1920.

HERBERT E. IVES.